United States Patent
Niemczyk

[11] Patent Number: 6,062,122
[45] Date of Patent: May 16, 2000

[54] CUTTING GUIDE SYSTEM FOR PORTABLE POWER SAWS

[76] Inventor: Gary Niemczyk, 28592 Cumberland, Farmington Hills, Mich. 48334

[21] Appl. No.: 09/062,925

[22] Filed: Apr. 20, 1998

[51] Int. Cl.[7] .................................................... B26D 5/00
[52] U.S. Cl. ............................. 83/745; 30/286; 30/287; 30/371
[58] Field of Search ................ 83/745; 33/403, 33/493, 630; 30/286, 289, 371, 372

[56] References Cited

U.S. PATENT DOCUMENTS

| | | | |
|---|---|---|---|
| 3,751,816 | 8/1973 | Hayes | 33/185 R |
| 4,059,038 | 11/1977 | Rietema | 83/745 |
| 4,075,920 | 2/1978 | Neal | 83/745 |
| 4,077,292 | 3/1978 | Cole | 30/372 |
| 4,164,882 | 8/1979 | Mericle | 83/409 |
| 4,307,513 | 12/1981 | Genge | 30/372 |
| 4,453,438 | 6/1984 | Zelli | 30/372 |
| 4,463,644 | 8/1984 | Ferdinand | 83/745 |
| 4,619,170 | 10/1986 | Maier et al. | 30/372 |
| 4,867,425 | 9/1989 | Mraglia, Jr. | 30/372 |
| 5,206,999 | 5/1993 | Stone | 30/371 |
| 5,365,822 | 11/1994 | Stapleton | 83/745 |
| 5,649,366 | 7/1997 | Scheiman | 30/371 |

*Primary Examiner*—M. Rachuba
*Attorney, Agent, or Firm*—Goldstein & Canino

[57] ABSTRACT

A cutting guide system for guiding a portable power saw across workpiece comprising a rectangular shaped guide plate. The guide plate includes an upwardly projecting rib member extending longitudinally along the guide plate between opposite front and rear ends for guiding the portable power saw through a straight cutting path. The guide plate further includes two T-shaped channels situated within the rib member adapted to slidably receive a pair of opposing clamping devices. The T-shaped channels extends longitudinally predetermined distance from the front and rear ends of the guide plate so as to permit the pair of opposing clamping devices to move longitudinally along the channel to engage against the opposing edges of the workpiece. Prior to the initial use of the guide plate, it is trimmed to size by a power saw guided by the rib member so as to specifically tailor the guide plate to the power saw with which was used to make the initial cut.

3 Claims, 4 Drawing Sheets

CUTTING GUIDE SYSTEM FOR PORTABLE POWER SAWS

BACKGROUND OF THE INVENTION

This invention relates to a cutting guide system for guiding a portable power saw. More particularly, the invention relates to a guide plate which employs a upwardly projecting rib member extending longitudinally along the guide plate for guiding a portable power saw across a workpiece in a straight cutting path. Further, the invention relates to a guide plate which also includes two T-shaped channels situated within the rib member adapted to slidably receive clamping devices, which are used to secure the guide plate against a workpiece to be cut.

Various reference uncovered in the prior art provide devices that include cutting guides and straight edges for guiding a portable power saw to make straight cuts in a workpiece. For example, U.S. Pat. No. 5,365,822 to Stapleton discloses a portable and adjustable cutting guide designed to minimize chipping of the cut edges on cuts made cross-grain on doors and panels, wherein the cutting guide comprises a rigid, rectangular plate having a raised member functioning as an edge stop for the platform of the saw. Likewise, U.S. Pat. No. 4,059,038 to Rietema discloses a device for guiding a portable power saw to make straight cuts in a workpiece, which employs a cutable guidepiece which is trimmed to define a reference edge which may be thereafter used to align a predetermined cutting path. U.S. Pat. No. 4,463,644 to Ferdinand discloses an expandable straight edge assembly comprising two guide rails fastened together by a joiner plate fitting within a channel in each of the rails to align and secure the rails together to form a continuous straight edge.

Stapleton may provide some utility for facilitating a straight cut, but it not useful for frequent and repeated use since Stapleton only solves the problem in a limited way. For instance, the cutting guide device is provided with slots for slidably engaging with clamping means, which weakens the overall structure of the device and thus will be susceptible to breakage. In addition, because the clamping means are provided on one side of the cutting guide device, this renders that side useless by a power saw. Further, the clamping member project upwardly adjacent the working area, thereby possibly posing safety hazard to those working with the device. Therefore, there is still a further need to provide an improved cutting guide system for guiding a portable power saw through a straight cutting path. Such a cutting guide system should include two T-shaped channels extending longitudinally from the front and rear ends thereof for slidably receiving a pair of opposing clamping device, wherein the T-shaped channels are situated within the upwardly projecting rib member so that the flat top surfaces on either side of the rib member are free and clear of all obstacles and thus can be used by the power saw. Moreover, such a cutting guide system should situate the clamping devices underneath the rib member so as to pose no safety hazard on top surface of the guide plate where portable power saws will be operated.

While these units mentioned above may be suitable for the particular purpose employed, or for general use, they would not be as suitable for the purposes of the present invention as disclosed hereafter.

SUMMARY OF THE INVENTION

It is an object of the invention to provide a cutting guide system which is simple in construction so as to minimize manufacturing costs, and yet is capable of guiding a portable power saw across a workpiece in a straight cutting path.

It is another object of the invention to provide a cutting guide system which includes two T-shaped channels extending longitudinally from the front and rear ends thereof for slidably receiving a pair of opposing clamping device, wherein the T-shaped channels are situated within the upwardly projecting rib member so that the flat top surfaces on either side of the rib member are free and clear of all obstacles and thus can be used by the power saw.

It is yet another object of the invention to provide a cutting guide system which situates the clamping devices underneath the rib member, thereby posing no safety hazard on top surface of the guide plate where portable power saws will be operated.

The invention is a cutting guide system for guiding a portable power saw across workpiece comprising a rectangular shaped guide plate. The guide plate includes an upwardly projecting rib member extending longitudinally along the guide plate between opposite front and rear ends for guiding the portable power saw in a straight cutting path. The guide plate further includes two T-shaped channels situated within the rib member adapted to slidably receive a pair of opposing clamping devices. The T-shaped channels extends longitudinally predetermined distance from the front and rear ends of the guide plate so as to permit the pair of opposing clamping devices to move longitudinally along the channel to engage against the opposing edges of the workpiece. Prior to the initial use of the guide plate, it is trimmed to size by a power saw guided by the rib member so as to specifically tailor the guide plate to the power saw with which was used to make the initial cut.

To the accomplishment of the above and related objects, the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
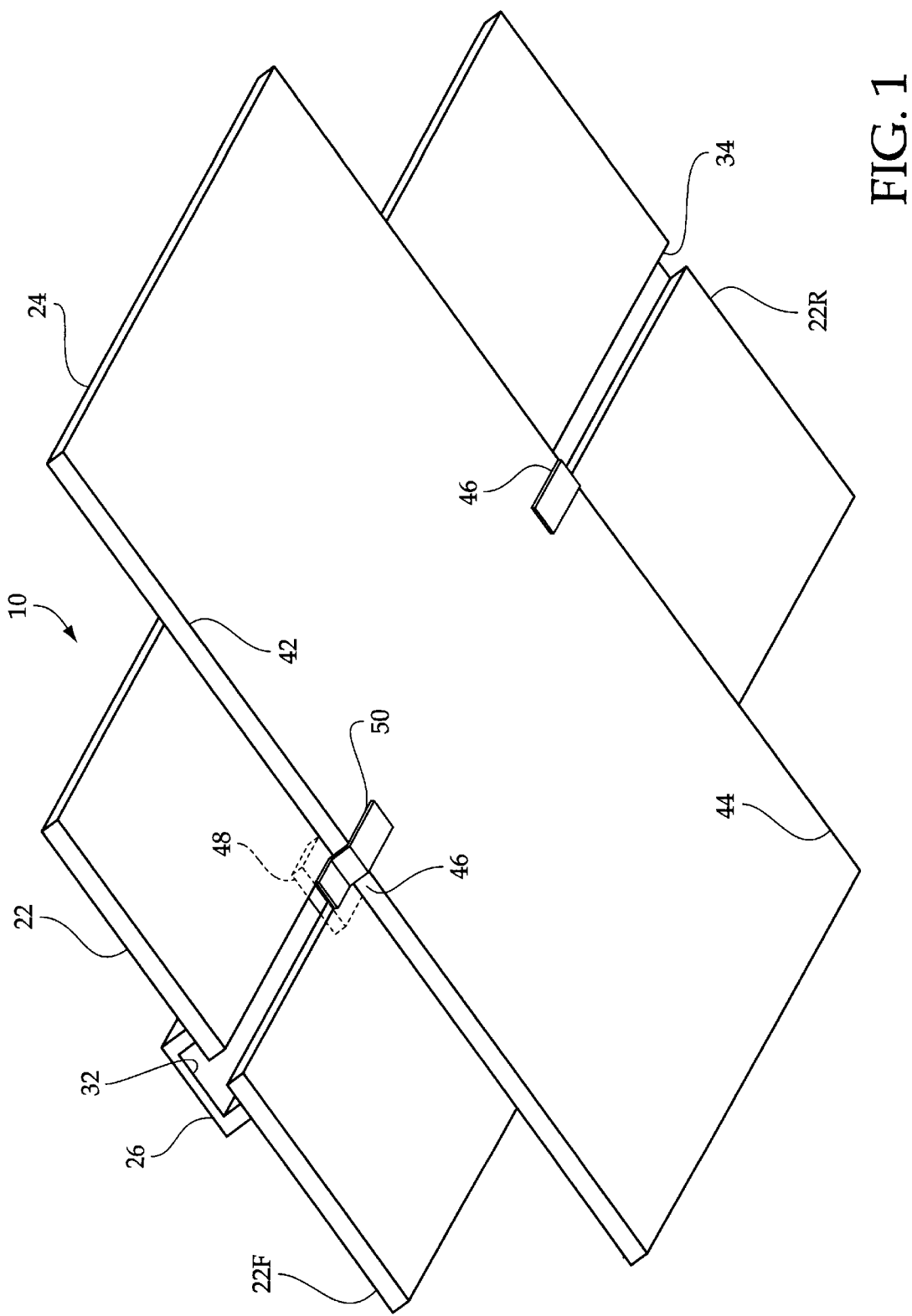
FIG. 1 is a diagrammatic perspective view of the instant invention being secured to a workpiece to be cut, illustrating a pair of opposing clamping devices engaged against the opposing edges of the workpiece.
Figure 3:
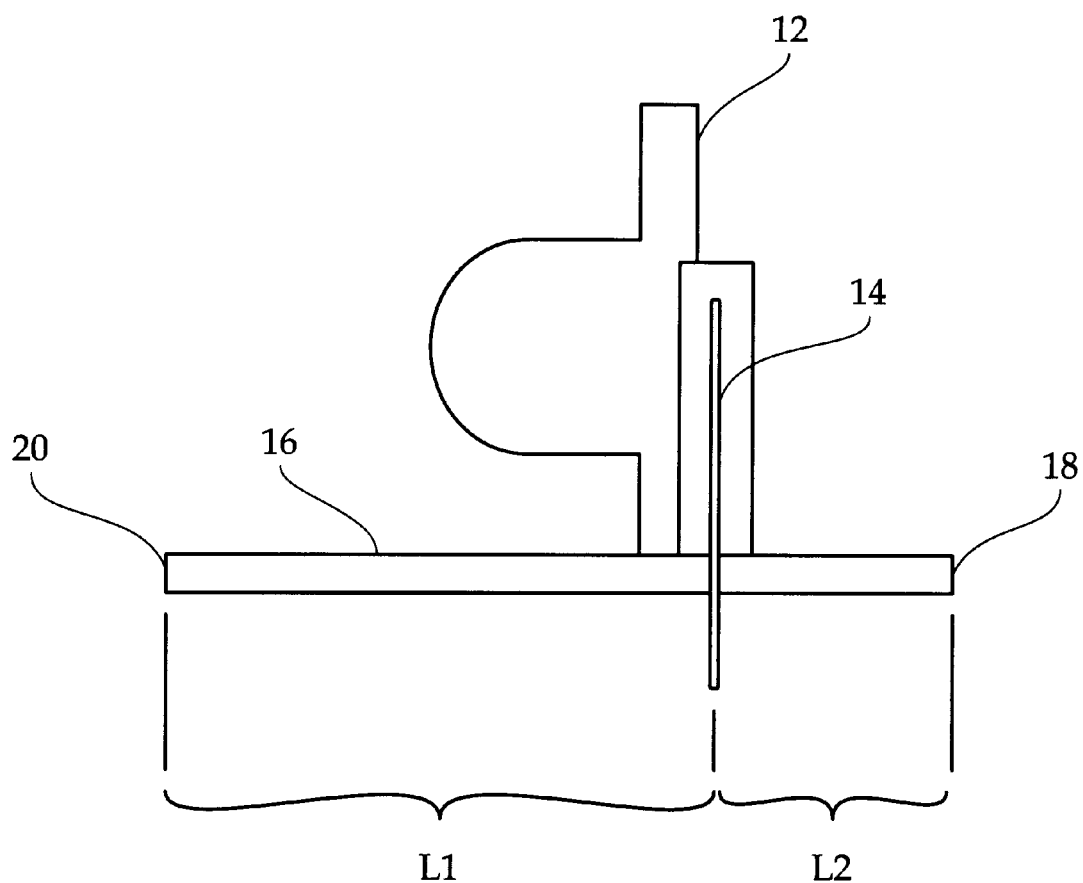
FIG. 3 is a front elevational view of a conventional portable power saw, illustrating a saw base secured to the base thereof.

FIG. 1 illustrates a preferred embodiment of a cutting guide system 10 in accordance with the principles of the present invention. As will be seen in following paragraphs, the cutting guide system 10 is designed to assist a user in making accurate, straight cuts in building materials with power tools such as circular saws, routers, jig saws, and the like. For better understanding of the present invention, a portable power saw 12 is illustrated in FIG. 3, which includes a blade 14, a flat saw shoe 16 secured to the base thereof, and inside 18 and outside 20 edges of the saw shoe 16. L1 represents the distance from the outside edge 20 of the saw shoe 16 to the saw blade 14. Similarly, L2 represents the distance between the inside edge 18 of the saw shoe 16 and the saw blade 14.

Figure 2:
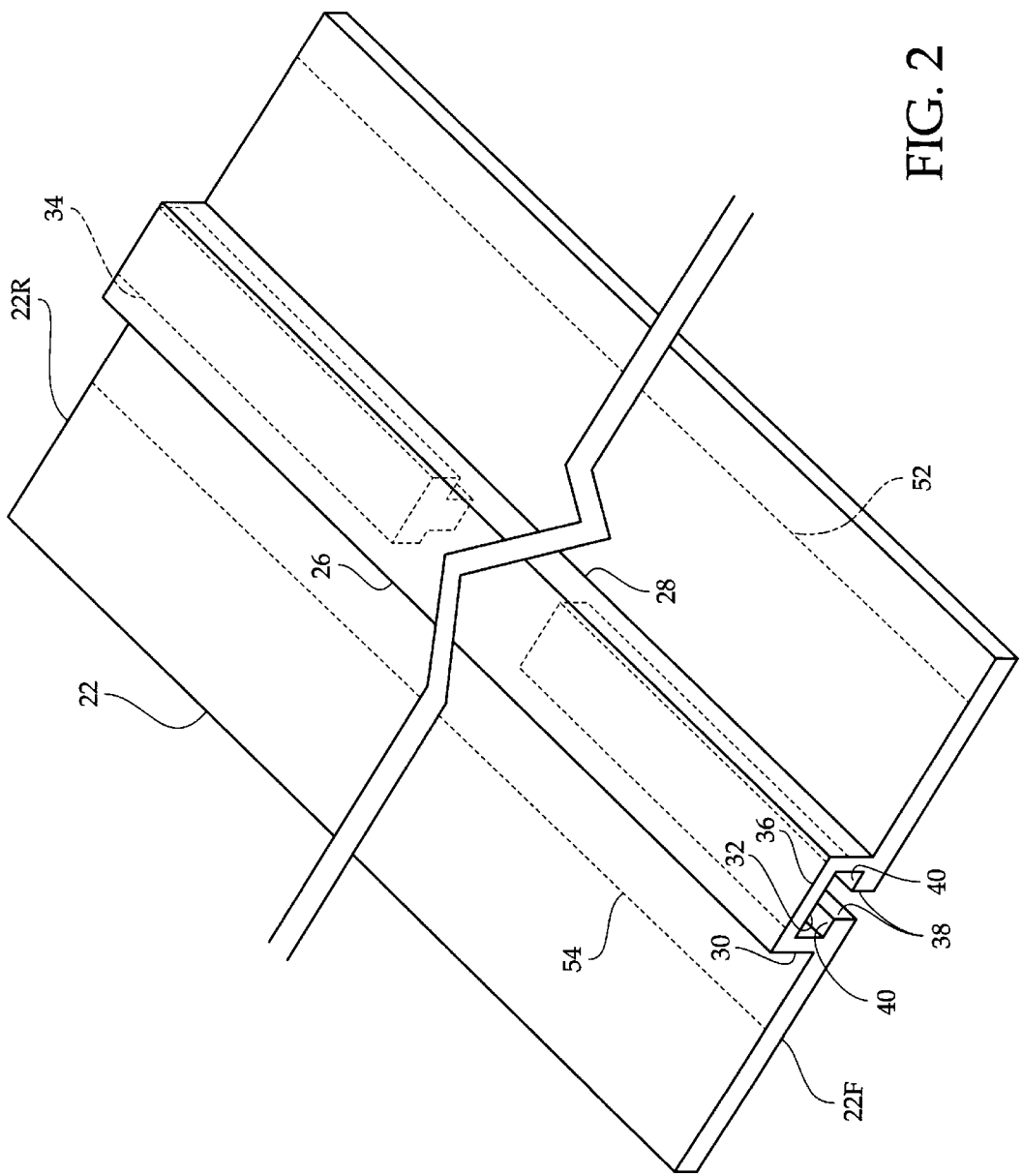
FIG. 2 is a diagrammatic perspective view of the instant invention, illustrating front and rear T-shaped channels situated within the upwardly projecting rib member and extending longitudinally predetermined distance from the front and rear ends, respectively.

FIGS. 1 and 2 illustrate the cutting guide system 10 comprising a guide plate 22 having an overall elongated rectangular shape. The guide plate 22 has a flat top surface for engaging the flat saw shoe 16 of the power saw 12 and a flat bottom surface adapted to lie against the surface of a workpiece 24. The length of the guide plate 22 is preferably greater than the length of the workpiece 24 to be cut. The guide plate 22 can be a single piece structure constructed of a durable, rigid plastic material or it can be constructed of any other suitable rigid and cutable material. The guide plate includes opposite front 22F and rear 22R ends, a pair of initial sides extending longitudinally between the front 22F and rear 22R ends and an upwardly projecting rib member 26 extending longitudinally therealong between the front end 22F and the rear end 22R. The upwardly projecting rib member 26 is defined in part by a first guide surface 28 along one side thereof and a second guide surface 30 along the other side thereof for guiding the portable power saw 12 in a straight cutting path.

FIGS. 1 and 2 illustrate the guide plate 22 further comprising a front T-shaped channel 32 and a rear T-shaped channel 34 situated within the upwardly projecting rib member 26, which are adapted to slidably receive a pair of clamping means. The front 32 and rear 34 T-shaped channels extend longitudinally predetermined distance from the front 22F and rear 22R ends, respectively. Each of the T-shaped channels 32 and 34 is defined in part by a top wall portion 36, and a pair of inwardly extending wall portions 38 spaced below the top wall portion 36, wherein the flanges 40 formed by the inwardly extending wall portions 38 for providing clamping surfaces. The wide opening and the relatively narrow opening permit the clamping means to move longitudinally along the T-shaped channels 32 and 34 and afford the clamping means to anchor to the inwardly extending wall portion 38, when the clamping means are positioned to engage the edges 42 and 44 of the workpiece 24. Two clamping devices 46 of any suitable type are provided in the front 32 and rear 34 T-shaped channels for securing and maintaining the guide plate 22 in contact with the workpiece 24. The two opposing clamping devices 46 are designed to engage against the opposing edges 42 and 44 of the workpiece 24 to clamp it between them. Each clamping device 46 includes a horizontal portion 48 adapted to slide laterally within the wide opening of the T-shaped channels 32 and 34, and a L-shaped bracket 50 movably attached to the horizontal portion 48 such that the L-shape bracket 50 presses the workpiece 24 and the guide plate 22 together when the clamping device 46 is tightened.

Figure 4:
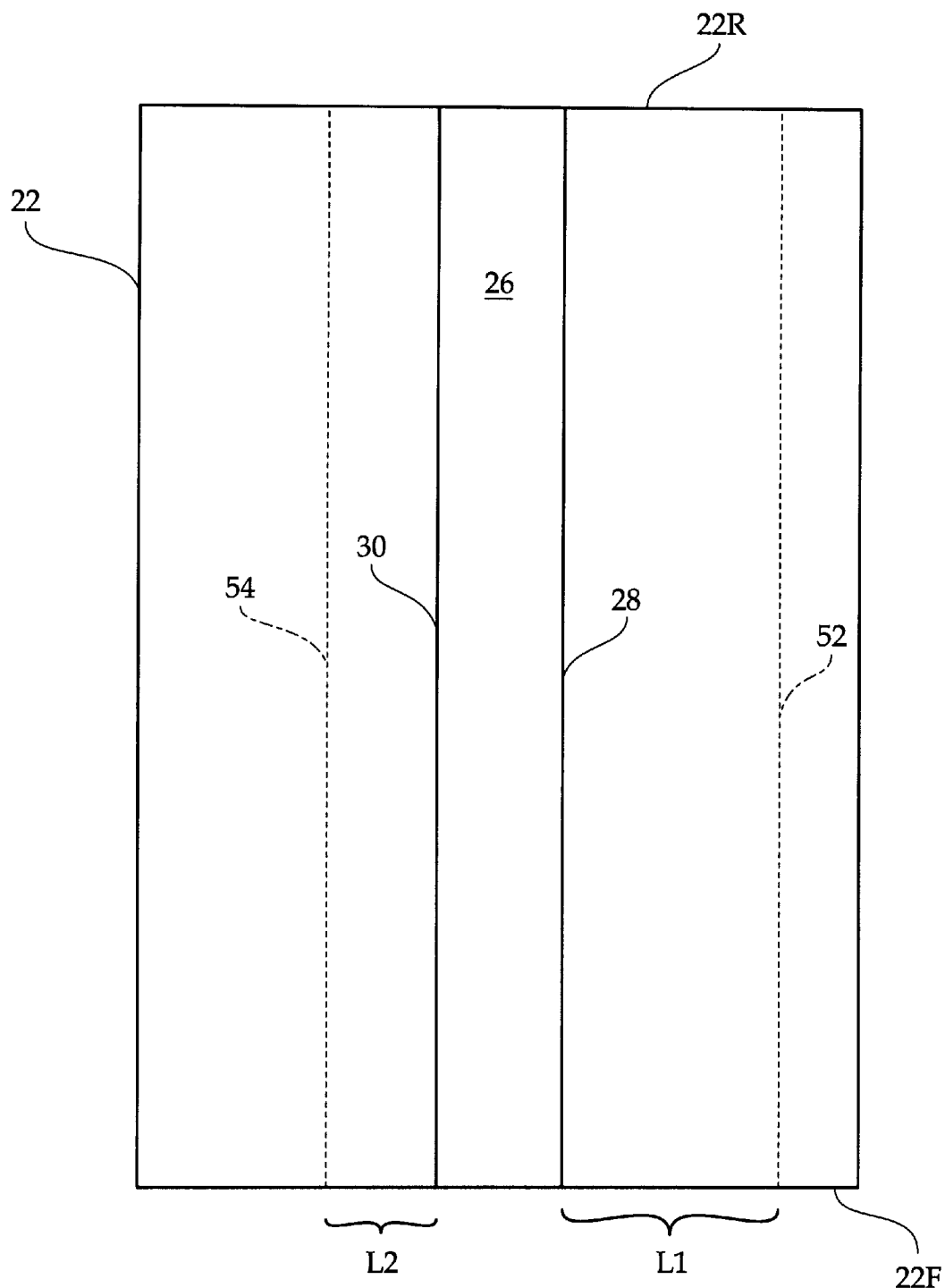
FIG. 4 is a top plan view of the instant invention, illustrating in dotted lines a preferred configuration of how the guide plate is to be trimmed to size.

Prior to its initial use, the guide plate 22 is trimmed to size by the first cut of a power saw guided by the upwardly projecting rib member 26 so that the guide plate 22 will be specifically tailored to the power saw with which was used to make the first cut. FIG. 4 illustrates as an example of how the guide plate 22 may be configured to size. A first gauged edge 52 is formed by guiding the outside edge 20 of the saw shoe 16 along the first guide surface 28 so that the distance between the first guide surface 28 and the first gauged edge 52, indicated by L1, is equal to the distance from the outside edge 20 of the saw shoe 16 to the saw blade 14. Similarly, a second gauge edge 54 is formed by guiding the inside edge 18 of the saw shoe 16 along the second guide surface 30 so that the distance between the second guide surface 30 and the second gauged edge 54, indicated by L2, is equal to the distance from the inside edge 18 of saw shoe 16 to the saw blade 14. In this manner, the first 52 and second gauge 54 edges are tailored to precisely fit to the saw shoe 16 configuration of the specific power saw 12 with which the guide plate is to be used. When the guide plate 22 is properly trimmed, either of the gauged edges 52 and 54 can be aligned with a desired line of cut on the surface of a workpiece 24 without having to compute the added dimension of the saw shoe 16 of the power saw 12 into each guided cut.

The operation of the cutting guide system 10 will now be described. To cut along the first gauged edge 52, the guide plate 22 is first positioned on the workpiece 24 such that the first gauged edge 52 thereof is aligned with the cut indicating line on the surface of the workpiece 24, and the clamping devices 46 are used to firmly secure the guide plate 22 to the workpiece 24. The power saw 12 is then pushed across the top surface of the guide plate 22 while the outside edge 20 of the saw shoe 16 thereof is engaged with the first guide surface 28 to assure a straight cut. Alternatively, to cut along the second gauged edge 54, the guide plate 22 is first positioned on the workpiece 24 such that the second gauged edge 54 thereof is aligned with the cut indicating line on the surface of the workpiece 24, and the clamping devices 46 are used to firmly secure the guide plate 22 to the workpiece 24. The power saw 12 is then pushed across the top surface of the guide plate 22 while the inside edge 18 of the saw shoe 16 thereof is engaged with the second guide surface 30 to assure a straight cut.

Many specific details contained in the above description merely illustrate some preferred embodiments and should not be construed as a limitation on the scope of the invention. Many other variations are possible.

What is claimed is:

1. A method of customizing a cutting guide by an end user for use with a particular portable power saw, said particular portable power saw having a saw shoe having opposite inside and outside ends, the particular portable power saw having a blade which extends from the saw shoe between the inside and outside ends wherein a first distance is defined between the blade and inside end and a second distance is defined between the blade and outside end, comprising the steps of:

providing a guide plate to the end user, said guide plate of a single piece of rigid cutable material such that the guide plate has a opposite front and rear ends, a pair of initial side edges extending longitudinally between the front and rear ends, and an upwardly projecting rib member extending longitudinally between the front and rear ends, the projecting rib having a first guide surface and a second guide surface which extend substantially parallel on opposite sides of the projecting rib member;

creating a first gauged edge by cutting the guide with the particular portable power saw by engaging the outside edge of the saw shoe against the first guide surface of the projecting rib and moving the power saw longitudinally while maintaining the power saw shoe against the first guide surface of the projecting rib and removing a portion of the guide plate between the first gauged edge and its nearest initial side edge, and creating a second gauged edge by cutting the guide with the particular portable power saw by engaging the inside edge of the saw shoe against the second guide surface of the projecting rib and moving the power saw longitudinally while maintaining the power saw shoe against the second guide surface of the projecting rib, and removing a portion of the guide plate between the second gauged edge and its nearest initial side edge.

2. The method of customizing a cutting guide as recited in claim 1, wherein the step of providing the guide plate of a single piece of cuttable material further comprises extruding the guide plate.

3. The method of customizing a cutting guide as recited in claim 2, wherein the step of forming the guide plate further comprises forming at least one channel extending longitudinally within the upwardly projecting rib member.

* * * * *